United States Patent [19]

Anderson

[11] Patent Number: 5,549,347
[45] Date of Patent: Aug. 27, 1996

[54] ALL WEATHER MECHANICALLY RECIPROCATABLE ROLL TOP COVER APPARATUS

[75] Inventor: Delsmore L. Anderson, Kandiyohi, Minn.

[73] Assignee: Willknight, Inc., Wayzata, Minn.

[21] Appl. No.: 467,916

[22] Filed: Jun. 5, 1995

Related U.S. Application Data

[63] Continuation of Ser. No. 92,490, Jul. 16, 1993, abandoned.
[51] Int. Cl.$^6$ ............................................. B60P 7/04
[52] U.S. Cl. ...................... 296/98; 242/157.1; 160/243; 160/265
[58] Field of Search ............................ 135/903; 242/149, 242/157.1, 347.2; 160/22, 243, 265; 296/98

[56] References Cited

U.S. PATENT DOCUMENTS

| | | | |
|---|---|---|---|
| 100,558 | 3/1870 | Robinson | 160/243 X |
| 526,459 | 9/1894 | Rand | 242/147 |
| 537,730 | 4/1895 | Stevens | 242/157.1 |
| 1,318,820 | 10/1919 | Watkins | 296/98 |
| 2,025,988 | 12/1935 | Kalff | 242/157.1 |
| 2,243,624 | 5/1941 | Gazet | 242/157.1 |
| 2,348,987 | 5/1944 | Lock | 242/157.1 |
| 2,414,169 | 1/1947 | Raymond | 242/149 X |
| 2,594,910 | 4/1952 | Germann | 296/98 |
| 3,148,384 | 9/1964 | Bartolucci et al. | 160/243 X |
| 3,397,009 | 8/1968 | Landenberger | 296/98 X |
| 3,423,126 | 1/1969 | Galvin et al. | 296/98 |
| 3,589,651 | 6/1971 | Niemkiewicz et al. | 242/149 |
| 4,302,043 | 11/1981 | Dimmer et al. | 296/98 |
| 4,505,512 | 3/1985 | Schmeichel et al. | 295/98 |
| 4,515,329 | 5/1985 | Sandvik | 242/157.1 |
| 4,657,062 | 4/1987 | Tuerk | 296/98 X |
| 4,659,134 | 4/1987 | Johnson | 296/98 |

FOREIGN PATENT DOCUMENTS

| | | | |
|---|---|---|---|
| 1026184 | 4/1953 | France | 242/157.1 |

OTHER PUBLICATIONS

"WCCO Shur–Lok Roll Up Tarp" descriptive flyer; 4 pages, dated Sep. 1985, published by Wahpeton Canvas Co, Inc., 2217 N. 9th St., Wahpeton, N.D. 58075.
"Roll It On . . . Roll It Off . . . Midwest Coverall for Trucks, Trailers, Wagons" descriptive flyer; 4 pages, dated Mar. 1981, published by Midwest Industries, Inc., Ida Grove, Iowa 51445.

*Primary Examiner*—Dennis H. Pedder
*Attorney, Agent, or Firm*—Fitch, Even, Tabin & Flannery

[57] ABSTRACT

The present invention is directed toward an all weather, mechanically reciprocatable, roll top cover apparatus for conveniently and reliably covering and uncovering the open top side of receptacles and the like. The apparatus consists of a support structure mounted at the open top side of the receptacle for supporting a flexible cover and of two primary operating drive devices. The cover is divided into two sloping panels by the support structure to facilitate precipitation removal and to maximize volumetric capacity of the receptacle. The operating drive devices include an uncovering drive device for removing the cover and a covering drive device for replacing the cover. In particular, the cover has one edge fixed at one side wall of the receptacle, while the opposing edge is free to travel between the opposing side walls. The uncovering drive device includes a shaft mounted to the cover centrally. To remove the cover, the shaft is rotated toward the cover's fixed edge to wind the cover on the shaft. A plurality of stops, located at the fixed edge's attachment to the side wall, prevent the shaft, with the cover wound thereon, from rotating beyond the side wall. The covering drive device includes a shaft rotatably mounted to the opposite side wall and a plurality of flexible straps and strap winding systems. The straps interconnect the shaft to the free edge of the cover. To cover the open top, the shaft is rotated to wind the straps for drawing the cover over the truss structure and across the open top side of the receptacle. Each of the strap winding systems includes a spool into which the strap is wound and a pivotally mounted drum guide bracket for restricting lateral displacement of the strap with respect to the spool and to pivot to accommodate varying angles at which the strap may enter and exit the strap winding system for preventing strap damage.

5 Claims, 3 Drawing Sheets

ALL WEATHER MECHANICALLY RECIPROCATABLE ROLL TOP COVER APPARATUS

This application is a continuation of application Ser. No. 08/092,490 filed Jul. 16, 1993, now abandoned.

FIELD OF THE INVENTION

The present invention relates generally to covering and uncovering open top receptacles and the like and, more particularly, to a mechanically reciprocatable cover apparatus for conveniently and reliably covering and uncovering openings of such receptacles.

BACKGROUND OF THE INVENTION

A wide variety of receptacles have been developed for holding, storing and transporting articles. These receptacles commonly include an open top side to facilitate loading and inspecting contents. For transport, these receptacles typically are mounted or placed on trucks or trailers. For instance, one such receptacle used to transport grain and the like is a hopper which is part of a tender mounted upon a truck or trailer. The hopper includes an open top side through which the grain is poured for filling the hopper.

Since receptacles are used commonly to contain and transport valuable contents, it is customary to provide cover arrangements for the open tops of these receptacles to prevent damage to such contents. That is, the cover arrangements protect the contents from relative exposure to damaging weather elements, such as sunlight and precipitation, and prevent the contents from escaping during transport. Typical cover arrangements include a tarp of flexible material, such as canvas, that is manually positioned across the open top of the receptacle, and which is secured by a number of tie downs, such as elastic straps or cords, with pins, latches and hooks.

Such typical cover arrangements are not entirely satisfactory for a number of reasons, which include the following. First, these tarps tend to be large and heavy. This makes positioning them over the opening relatively time consuming and inconvenient. Furthermore, this is especially the case when the receptacle is elevated, such as on a truck or trailer, or has high side walls. Likewise, removal of such cover arrangements is relatively time consuming and inconvenient.

Second, the securement of the tarp commonly requires one to install a plurality of the above-mentioned tie downs individually and to inspect the installation to ensure that the tarp is adequately secured. This tarp position and securing operation is even more cumbersome for a single operator to perform. Third, such tie downs tend to be relatively inadequate for they involve securing means, such as hooks or latches, which may become loose or detached during transit. This may allow the contents to escape and to become otherwise damaged.

Thus, there is a need for an all weather cover apparatus for receptacles which may be conveniently opened and closed and that does not involve suspectable tie downs, which may become loose. Also, it is desired that such apparatus be capable of actuation by a single operator.

A general object of the present invention is to provide receptacles with an all weather cover apparatus that mechanically reciprocates for convenient and reliable opening and closing operation by a single operator and which is suitable for a range of weather and transport conditions.

A further object is to provide an all weather, mechanically reciprocatable cover apparatus which is highly durable, efficient, and cost effective to manufacture, install and operate.

SUMMARY OF THE INVENTION

In accordance with the present invention, there is provided an all weather, mechanically reciprocatable, roll top cover apparatus for receptacles and the like having open top sides. In general, the operation of the present apparatus is to reciprocate a flexible cover across the open top side of a receptacle between a covered position in which the cover extends across the open top side of the receptacle and an uncovered position in which the cover is removed completely or partially to facilitate content inspection or loading of the receptacle.

The apparatus consists of a support structure mounted at the open top side of the receptacle and two primary operating drive devices. In particular, the support structure includes a number of trusses bowing upward symmetrically to a maximum center height to support a flexible cover in a manner that divides it into two downward sloping panels to facilitate precipitation removal. The cover has one edge fixed at one side wall of the receptacle and an opposing edge free to travel between the opposing side walls during removal and replacement of the cover. The cover may include reinforcement tubes at the fixed edge and free edge. The reinforcement tube at the fixed edge is employed to cooperate with an adapted bracket for anchoring the fixed edge to the side wall.

The two operating drive devices include an uncovering drive device for selectively removing the cover and a covering drive device for selectively replacing the cover across the open top side of the receptacle. The uncovering drive device includes a shaft secured to the cover centrally and longitudinally. To remove the cover, the shaft is rotated over the support trusses toward the cover's fixed edge to wind the cover on the shaft. Since the shaft is attached to the cover centrally, the cover doubles over on itself when being wound on the shaft to facilitate rapid removal of the cover. A hand-crank tool may be employed to rotate the shaft. Accordingly, the shaft is provided with a socket at one end into which a complementarily tool insert of the hand-crank tool may be inserted. The purpose is to enable the cover to be removed by a single operator from a ground location.

A plurality of stops are positioned at the side wall where the fixed edge of the cover is attached to prevent the shaft, with the cover wound thereon, from rotating beyond the side wall. The stops also may be configured to receive the reinforcement tube to mount the fixed edge to the side wall.

The covering drive device includes a shaft rotatably mounted to the opposite side wall with a plurality of mounting brackets. A plurality of straps interconnect the free edge of the cover and the shaft. To replace the cover, the shaft is rotated to wind the straps for drawing the cover over the truss structure and across the open top side of the receptacle. A hand-crank tool may be employed to rotate the shaft. Accordingly, the shaft is provided with a socket at one end into which a complementarily tool insert of the hand-crank tool may be inserted.

For winding the straps, the covering device includes a plurality of strap winding systems. There is one strap winding system per strap and each one is located adjacent one of the shaft mounting brackets. Each of the strap winding systems includes a spool formed on the shaft into which the strap is wound out of to remove cover and wound in to the replace the cover. Additionally, each system is provided with a pivotally mounted guide bracket for directing the strap into and out of the spool. The guide bracket includes a base interconnecting a pair of guide walls. At one end of the bracket, a cam pin extends between the guide walls to locate the strap between the pin itself and the base, while the guide walls restrict the strap from lateral movement. With the opposite end, the bracket is mounted on a mounting pin, which extends horizontally from the adjacent shaft mounting bracket, and pivots about the mounting pin with respect to the shaft and spool to allow for variations of angles at which the strap may approach the spool. This assists in preventing the bracket from interfering with the winding and unwinding operation.

BRIEF DESCRIPTION OF THE DRAWINGS

The present invention will be described in connection with the accompanying drawings, which illustrate the preferred embodiments and details of the invention, and in which.

DETAILED DESCRIPTION OF THE PREFERRED EMBODIMENT

Figure 1:
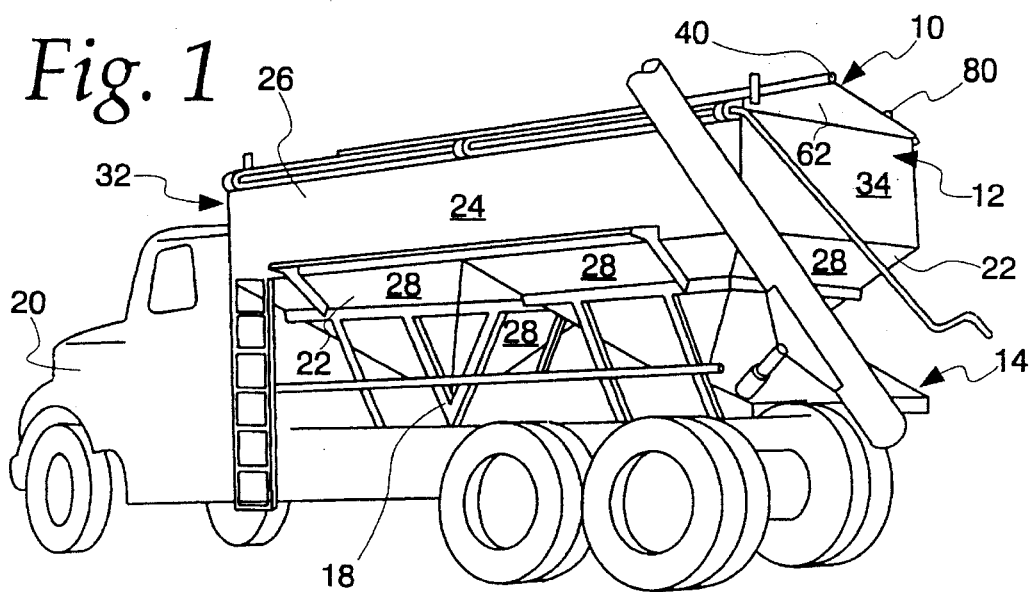
FIG. 1 is a perspective view of a vehicle having a tender employing an all weather, mechanically reciprocatable, roll top cover apparatus of the present invention.

As shown in the drawings for purpose of illustration, the invention is preferably embodied in an all weather, mechanically reciprocatable, roll top cover apparatus 10 which reciprocates to cover and uncover an open top side 16 of a hopper 12 or any other receptacle or container having an open side. As illustrated in FIG. 1, the hopper 12 is part of a tender 14 that includes a truss system 18 suitable for supporting and mounting the hopper 12 on a truck 20 or trailer for road or ground travel.

In general, the hopper 12 comprises a pair of lower converging chambers 22 communicating with an upper continuous chamber 26 in order to maximize volumetric capacity of the hopper 12. The upper chamber 26 includes the open top 16 (FIG. 2) for enabling the chambers 22 and 26 to be filled. Each of the lower chambers 22 terminates at the lowermost pan of the hopper 12 with a hopper discharge (not shown) for emptying the hopper 12. In particular, both of the lower chambers 22 comprise a number of downwardly extending and inwardly converging side walls 28 for directing the hopper's contents toward the hopper discharge.

Figure 2:
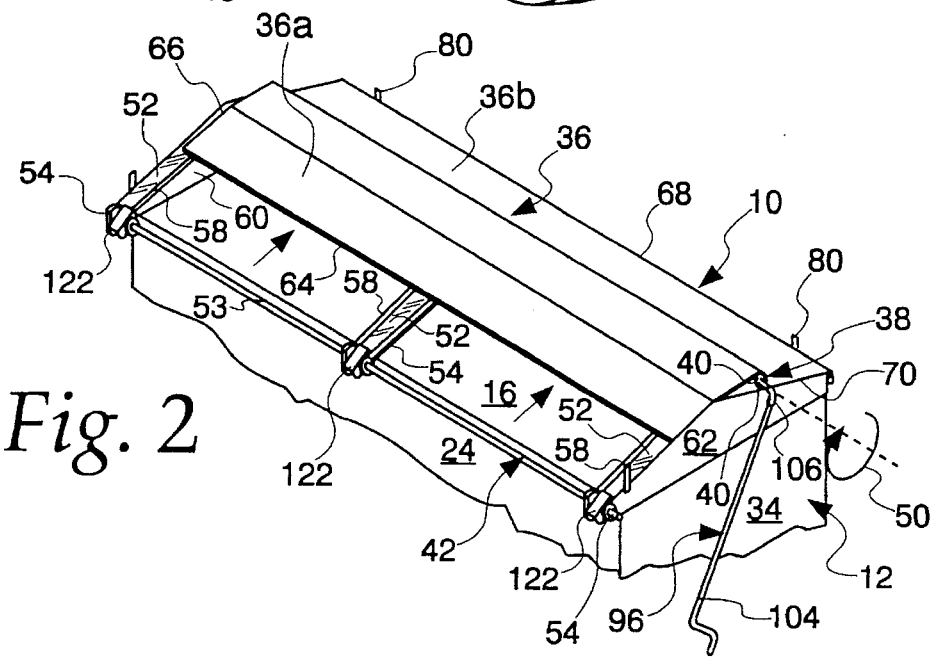
FIG. 2 is an enlarged perspective view of the roll top cover apparatus of FIG. 1 illustrating the uncovering operation of the uncovering drive device of the present invention.

With respect to the rear of the hopper 12, the upper chamber 26 has a rectangular configuration that is defined by left and right vertical sides wall 24 and 30 (FIG. 7), respectively, which are parallel to one another, and by front and rear vertical walls 32 and 34, respectively, which are parallel to one another and interconnect the left and right side wall 24 and 30. These four walls 24, 30, 32 and 34 all terminate at the upper end of the hopper 12 to define the open top side 16 (FIG. 2). In any event, the shape of the hopper, or any other receptacle, container and the like, may be varied from that illustrated herein and fall within the purview of the subject invention.

Figure 3:
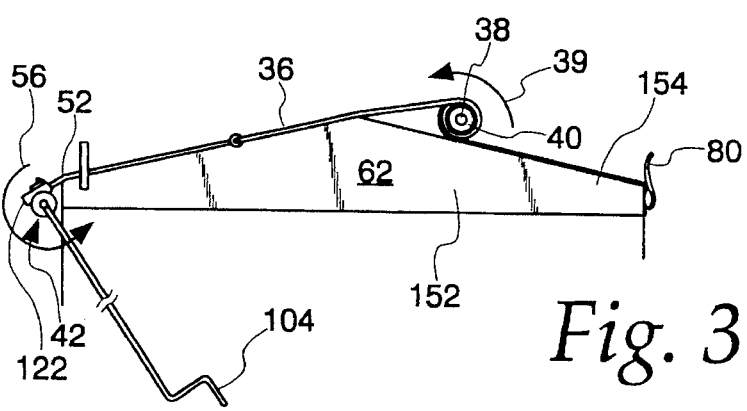
FIG. 3 is a rear elevational view of the roll top cover apparatus of FIG. 1 illustrating the covering operation of the covering drive device of the present invention.

In accordance with one aspect of the present invention, the all weather, mechanically reciprocatable, roll top cover apparatus 10 includes a flexible cover 36 capable of being mechanically reciprocated between a covered position and an uncovered position, as best illustrated by FIGS. 2 and 3. In the covered position, the cover 36 extends across the open top 16 to entirely overlay the chambers 22 and 26 of the hopper 12. On the other hand, in the uncovered position, the cover 36 has been removed from the open top 16 to expose the chambers 22 and 26 of the hopper 12.

For reciprocating the cover 36 therebetween, the apparatus 10 includes two primary devices which are an uncovering drive device 38 for removing the cover 36 and a covering drive device 42 for positioning the cover across the open top 16. To remove the cover 36, the uncovering drive device 38 includes a shaft 40, which, when rotated in the clockwise direction, as indicated by reference number 50, toward the fight side wall 30, the cover 36 is wound thereupon to uncover the open top 16 of the hopper 12. To position the cover 36 across the open top 16, the coveting drive device 42 includes a shaft 53, having a number of spools 54, that rotates in a counter-clockwise direction, as indicated by reference number 56, to wind in its spools 54 a number of straps 52 attached to the cover 36. In effect, the straps 52 draw the cover 36 across the open top 16 to cover the chambers 22 and 26 by unwinding the cover 36 from the shaft 40 of the uncovering drive device 38, as indicated by reference number 39 in FIG. 3.

Further in accordance with the present invention, the apparatus 10 facilitates precipitation removal and increases volumetric capacity of the hopper 12. For this purpose, the apparatus 10 includes a plurality of upward symmetrically bowing support trusses 58 for elevating the cover 36 in a manner to configure it with two similar downward sloping panels 36a and 36b, when in the covered position, as best illustrated in FIG. 2. Additionally, the apparatus 10 includes vertical extending front and rear panels 60 and 62, respectively, for closing the ends of the apparatus 10, which would otherwise be exposed due to elevating the cover 36 with the trusses 58.

More particularly, the cover 36 is made from a lightweight, durable, flexible material which may be water resistent and, for example, may be plastic or fabric, such as a canvas tarp. Also, the material may be prepared to be fire retardant. For instance, the preferred cover 36 is a nylon tarp having an overall weight of about 16 ounces per square yard. This includes a nylon base cloth of about 5.5 ounces per square yard. However, the material of the cover may be varied from that illustrated herein and fall within the purview of the subject invention.

As best illustrated in FIG. 2, the cover 36 generally has rectangular configuration with an area of coverage sufficient enough to extend across the entire open top 16 in order to cover completely the chambers 22 and 26 of the hopper 12. In particular, the cover 36 has four perimeter edges that include two longitudinally extending edges, which are a free edge 64 and a fixed edge 68, and two transversely extending edges 66 and 70.

Figure 7:
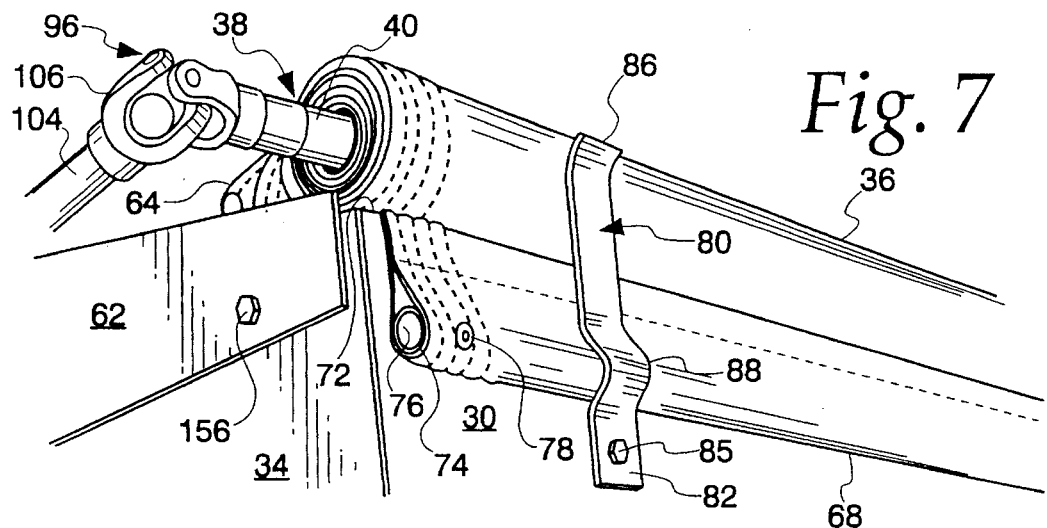
FIG. 7 is a partial perspective view of the roll top cover apparatus of FIG. 1 illustrating the operation of the uncovering drive device when the cover is in the uncovered state.

As best illustrated in FIG. 7, the fixed edge 68 is anchored near an upper edge 72 of the right side wall 30, while the opposing free edge 64 is allowed to travel between the left side wall 24 and the right side wall 30, as the cover 36 reciprocates between its covered and uncovered positions. Both the free edge 66 (FIG. 4) and the fixed edge 68 (FIG. 7) are provided with a longitudinally-extending, tear-drop cross-sectioned pocket 74 through which a reinforcement tube 76 extends substantially coextensive with its respective edge. The reinforcement tubes 76 are employed to assists in anchoring the fixed edge 68 to the right side wall 30 and to enable the straps 52 to be affixed at the free edge 66. Additionally, the reinforcement tubes 76 prevent the cover 36 from distorting. A plurality of rivets 78 secure the reinforcement tubes 76 in their respective pocket 74 against movement and secure the straps 52 to the reinforcement tube 76 at the free edge 66.

A plurality of stop-mounting brackets 80 are provided to prevent the uncovering drive device 38 from translating beyond the right side wall 30 and to fasten the fixed edge 68 to the right side wall 30. Each bracket 80 has a metal strap like construction which includes a lower mounting end 82 having an aperture through which a bolt 85 extends to mount the stop bracket 80 to the right side wall 30. An upper end 86 is arched slightly outward with respect to the hopper 12. This prevents the stop-mount bracket 80 from damaging the cover 36 when the bracket 80 is engaged with the wound cover 36 to prevent further translation of the uncovering drive device 38. An intermediate portion 88 is sufficiently arched outwardly convex with respect to the hopper 12 for securing the fixed edge 68 to the right side wall 30.

In particular, to attach the fixed edge 68 to the right side wall 30, each intermediate bend 88 is arched sufficiently to receive the reinforcement tube 76 of the fixed edge 68 for clamping it between an inner surface of the intermediate bend 88 and the outside of the right side wall 30 of the hopper 12. To prevent the uncovering drive device 38 from going beyond the right side wall 30, each of the upper ends 86 of the brackets 80 terminates sufficiently above the upper edge 72 of the right side wall 30 to act as a stop to prevent the shaft 40 of the uncovering drive device 38 from rolling off of the hopper 12.

Figure 8:
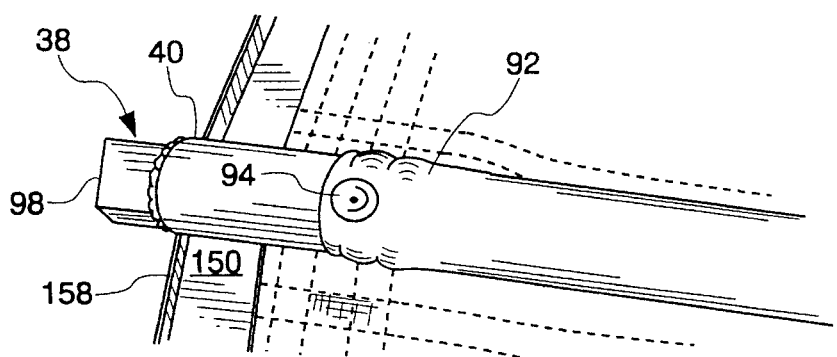
FIG. 8 is a partial top view of the roll top cover apparatus of FIG. 1 illustrating the uncovering drive device with the cover in the covered state.

Turning now to FIGS. 2, 7 and 8, the shaft 40 of the uncovering drive device 38 is attached centrally to the cover 36 to extend longitudinally and substantially coextensive therewith. In particular, the cover 36 provides a centrally located, circular cross-sectioned, shaft pocket 92 through which the shaft 40 extends. To start the cover 36 winding for removing the cover 36, a plurality of screws or rivets 94 are employed to secure the shaft 40 within the shaft pocket 92. These rivets 94 are primarily employed for preventing the shaft 40 from movement within the pocket 92 and to initiate the winding of the cover 36 on the shaft 40, because, once started, the cover 36 doubles over, and tightens, on itself as winding continues.

To remove the cover 36, the shaft 40 is rotated clockwise, as illustrated by reference number 50, by a manual hand-crank tool 96. For being rotated by the tool 96, one end of the shaft 40 is provided with a hollow drive socket 98 adapted to receive a complementarily adapted tool insert 100 (FIG. 4) of the hand-crank tool 96. In particular, the hollow socket 98 has a rectangular cross-section for receiving the tool insert 100 which has a complementary rectangular cross-section configuration. The insert 100 also may include an insert tip 102 (FIG. 4) which is slightly beveled or rounded to assist in introducing the tool insert 102 into the hollow socket 98.

The manual hand-crank tool 96 includes a shaft portion 104 for enabling one to operate the apparatus 10 from a ground standing position. Accordingly, a universal joint 106 is provided to attach the tool insert 100 to the shaft portion 104 for pivotal movement. In addition to operating the apparatus 10, this pivotal function enables the shaft portion 104 of the hand-crank tool 96 to be rotated for securing the shaft portion 104 with a crank shaft holder 108 (FIG. 9) mounted to the rear of the hopper 12, while the tool insert 100 remains in the socket 98.

Figure 9:
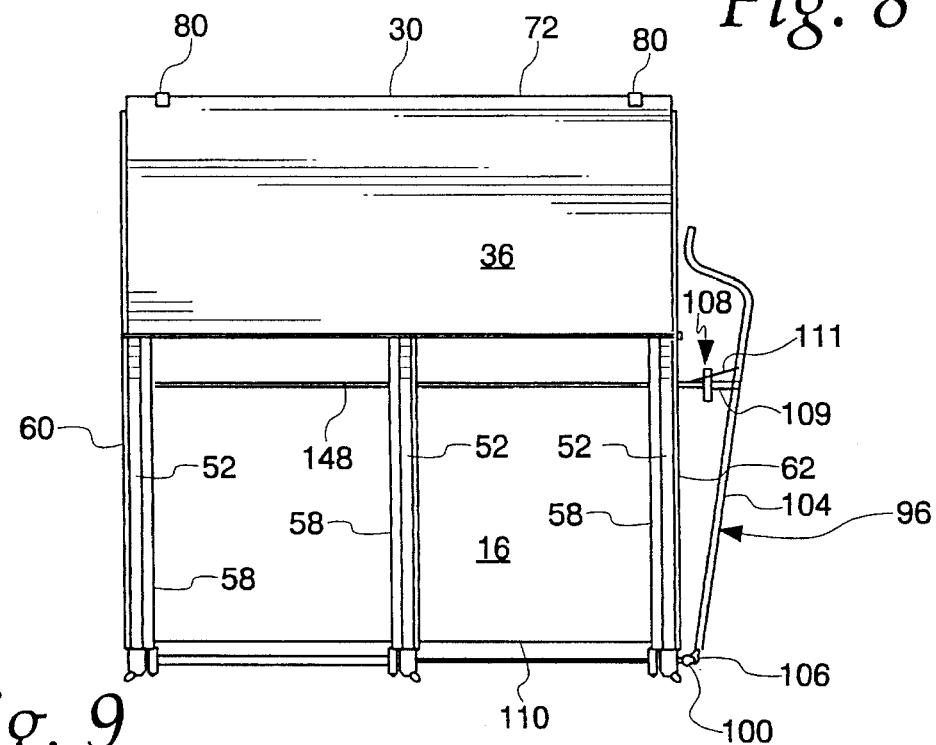
FIG. 9 is a top view of the roll top cover apparatus of FIG. 1 illustrating its support trusses while the cover is in a partially uncovered state.

As illustrated in FIG. 9, the crank shaft holder 108 includes a bracket 109 which extends perpendicularly from the rear of the hopper 12 for holding the tool shaft portion 104 during transport. Also, the holder 108 may be provided with a spring 111 extending from the rear of the hopper 12 to bias the tool shaft portion 104 into securement with the holder 108.

Returning to FIG. 2, at the end opposite the universal joint 106, the shaft portion 104 has an S-shape configuration to facilitate manual rotation of the shaft portion 104 and the tool insert 100 via the universal joint 106. The hand-crank tool may be manufactured from a lightweight, durable noncorrosive material, for example, metal, such as stainless steel or aluminum, or sturdy plastic.

Turning now to FIGS. 3–6, the shaft 53 of the covering drive device 42 is mounted for rotation adjacent an upper edge 110 of the left side wall 24 with a plurality of mounting brackets 112, which are equidistantly spaced and which project perpendicularly from the left side wall 24. Each bracket is provided with an aperture through which the shaft 53 extends for rotation therein. Three brackets are illustrated; however, the necessary number of brackets for preventing the shaft from deflecting may be varied depending on the size of the cover and the length of the hopper.

For reciprocating the cover 36, the spools 54 are each part of a separate strap winding system 120 for directing the winding and unwinding of the straps 52 during reciprocation of the cover 36 across the open top 16. In particular, each spool 54 is located immediately adjacent one of the mounting brackets 112. Each of the straps 52 interconnect one of the spools 54 to the free edge 64 of the cover 36. At the free edge 64, the straps 52 may be stitched to directly to the cover 36 or attached to the reinforcement tube 76 by a screw or rivet 78. To draw the cover 36 across the open top 16, the shaft 53 rotates in the counter-clockwise direction, as illustrated by reference number 56 in FIG. 3, to wind each of the straps 52 into its respective spool 54 for drawing the cover 36 to its closed position. In removing the cover 36, the shaft 53 is able to rotate freely in the clockwise direction. This enables the winding systems 120 to payout their respective strap 52 when the uncovering drive device 38 draws the free edge 64 to remove the cover 36.

In particular, each spool 54 consists of a pair of washers which, with respect to the left side wall 24, are a left washer 116 and a right washer 118. The washers 116 and 118 guide the strap 52 to wind on itself in the spool 54 by preventing lateral displacement of the strap 52 with respect to the shaft 53. Accordingly, the washers 116 and 118 are mounted directly to the shaft 53 at approximately strap width apart, which may be done by welding.

To direct each of the straps 52 into its respective spool 54, each strap winding system 120 provides a strap drum guide bracket 122. In particular, each of the drum guide brackets 122 extends longitudinally with a U-shape cross-section defined by a base 124 interconnecting a pair of guide appendages which, with respect to the left side wall 24 of the hopper 12, are a left guide appendage 126 and a right guide appendage 128. The left and right guide appendages 126 and 128 are spaced approximately strap 52 width apart to prevent lateral strap 52 movement with respect to the shaft 53 and the drum guide bracket 122.

Each of the drum guide brackets 122 includes a pivotal mounting end 138 for enabling a strap following end 140, that is located opposite thereof, to pivot for guiding effectively the strap 52 into the spool 54. In particular, each drum guide bracket 122 is mounted with its pivotal mounting end 138 on a guide bracket mount pin 130. Each of the guide bracket mount pins 130 projects from the adjacently located mounting bracket 112 to extend substantially axial to the shaft 53. That is, each of the mounting pins 130 provides a substantially horizontal pivot axis for enabling the drum guide brackets 122 to pivot for accommodating variations of angles at which the strap 52 may enter the strap winding systems 120. This assists in preventing undue wear and tear on the straps. Additionally, this allows the strap winding systems to be used without substantial modification on a variety of receptacles.

For mounting the pivot mount end 138 of the drum guide bracket 122 on the pin 130, each of the bracket's guide appendages 126 and 128 includes a mounting aperture 132, wherein the two are aligned with one another to enable the pin 130 to extend therethrough. The pivotal mounting enables the drum guide brackets 122 to pivot toward the spool 54 to prevent the it from displacement with respect to the guide bracket mounting pin 130. In particular, the left guide appendages 126 of the drum guide bracket 122 fits immediately inside the left washer 116, while the right guide appendage 128 fits immediately inside the right washer 118.

For directing the strap 52, the left guide appendage 126 and the right guide appendage 128 each include, at the strap following end 140 of the drum guide bracket 122, another aperture 136, wherein these two are aligned for receiving a strap cam pin 134. The cam pin 134 maintains the strap 52 in the drum guide bracket 122 while allowing the strap 52 to cam over during strap 52 winding and payout. For instance, as the strap 52 is wound into, and out of, the spool 54, it cams against an inside surface region 142 of the base 124 of the drum guide bracket 122, while also camming over a linear portion 144 of the cam pin 134. Hence, the cam pin 134 and the base 124 cooperate to maintain the strap 52 within the drum guide bracket 122.

Also, the pivotal mounting enables the drum guide bracket 122 to pivot depending on the amount of strap 52 wound in and out of the spool 54. That is, the left and right guide appendages 126 and 128, respectively, are capable of riding on the wound strap 52 in the spool 54, as it is being wound in, or unwound from, the spool 54. For instance, the greater the amount of strap 52 wound in the spool 54 the greater the pivot angle of the drum guide bracket 122 with respect to the spool 54 and the less the amount of strap 52 wound in the spool 54 the smaller the pivot angle with respect to the spool 54. This pivoting operation also may become dependent upon the angle at which the strap 52 leaves the upper edge 110 of the left side wall 24. That is, the more strap 52 wound in the spool 54, the greater the angle between the strap 52 and the left side wall 24. Therefore, this pivoting action enables the drum guide brackets 122 to direct the straps 52 appropriately onto the spool 54 by allowing the drum guide bracket 122 to pivot freely into, and out of, the spools 54 a predetermined distance, thereby preventing it from interfering with the winding operation of the winding system 120, from becoming detached from the mount pin 130 and from damaging unnecessarily the strap 52.

Each of the drum guide brackets 122 is provided with a pin lock 160 projecting upward from the top side of the base 124. Each of the pin locks 160 cooperate with an arcuate portion 162 of each of the cam pins 134 to prevent the cam pins 134 from becoming inadvertently detached from their respective drum guide bracket 122.

Figure 4:
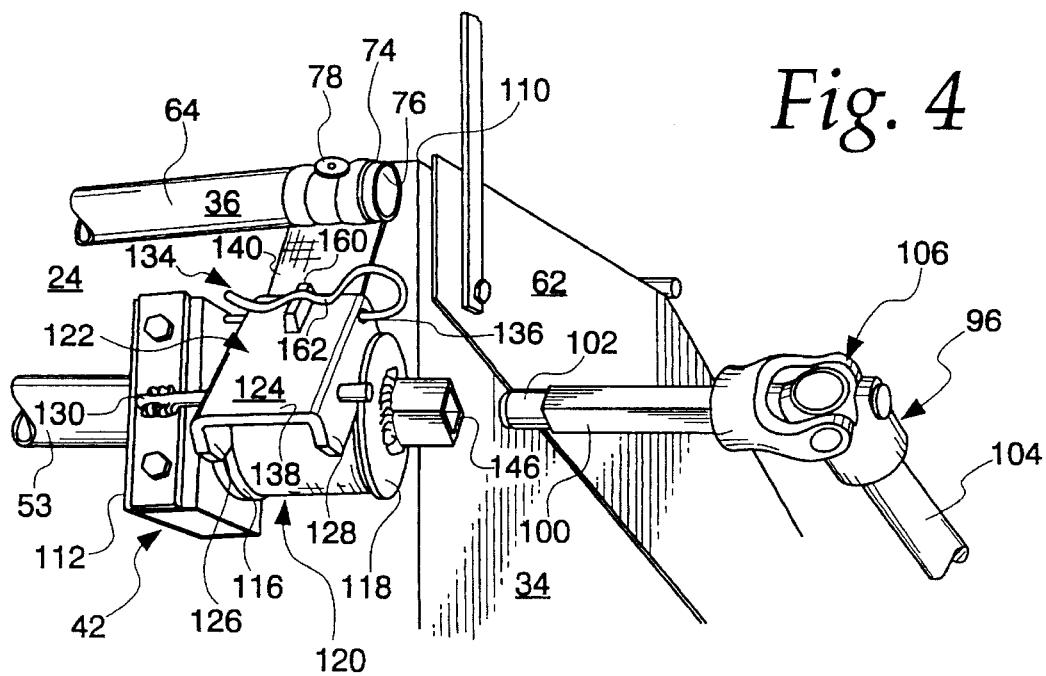
FIG. 4 is a partial perspective view of the roll top cover apparatus of FIG. 1 illustrating one of the strap winding systems included as part of the covering drive device.
Figures 5, 6:
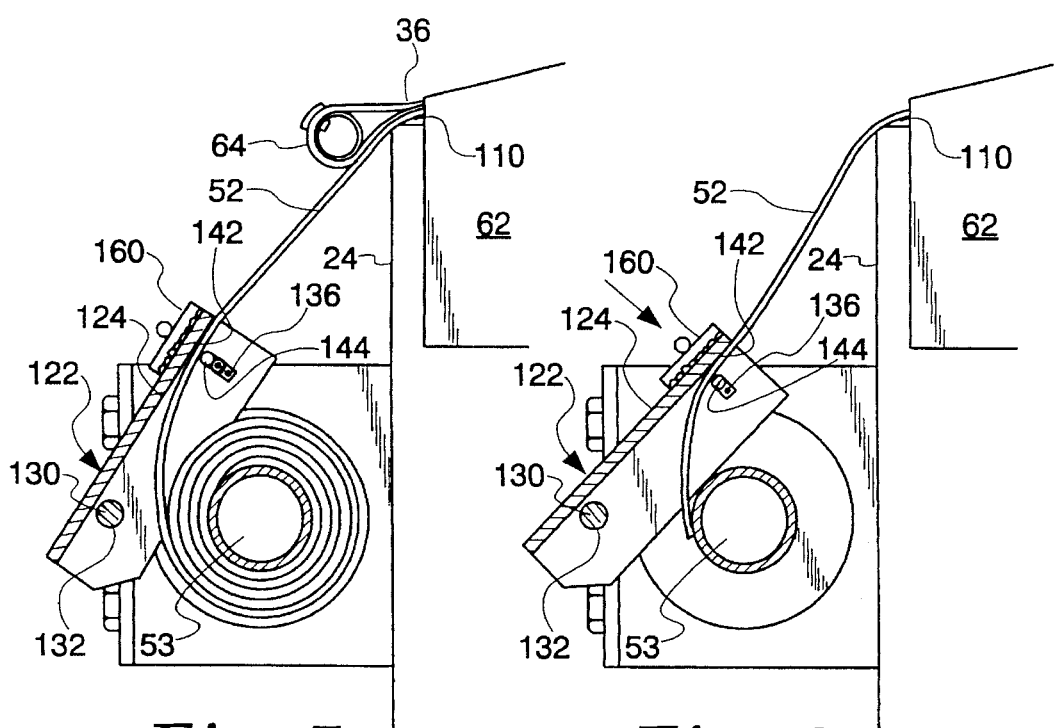
FIG. 5 is a cross-sectional view of the strap winding system of FIG. 4 to illustrate operating conditions when the cover is in the covered state.
FIG. 6 is a cross-sectional view of the strap winding system of FIG. 4 to illustrate operating conditions when the cover is in the uncovered state.

As illustrated in FIG. 4, one end of the shaft 53 includes a hollow drive socket 146 substantially identical to the hollow drive socket 98 of the shaft 40 of the uncovering drive device 38. This socket 146 is also adapted to receive the complementarily adapted tool insert 100 of the hand-crank tool 96. The hand-crank tool 96 therefore is also employed to rotate the shaft 53 of the covering drive device 42 in the counter-clockwise direction 56 (FIG. 3) for rewinding the straps 52 to draw the cover 36 over the trusses 58 and across the open top side 16 of the hopper 12. That is, the straps 52 draw the free edge 64 of the cover 36 to unwind it from the shaft 40 of the uncovering drive device 38. The shaft 53 may be manufactured from a lightweight, durable, non-corrosive material, for example, metal, such as stainless steel or aluminum, or sturdy plastic. Alternatively, both the uncovering drive device 38 and the covering drive device 42 may be motor driven and still fall within the purview of the present invention.

As illustrated in FIGS. 2 and 9, the upward bowing support trusses 58 are equidistantly spaced to extend across the open top 16 located above the upper chamber 26 for supporting and elevating the cover 36. In particular, the trusses 58 are positioned with one immediately adjacent the front wall 32, one immediately adjacent the rear wall 34 and one directly therebetween. Each of the trusses 58 extends transversely across the open top 16 to interconnect the left and right side walls 24 and 30 and is attached at its ends to the inside of the left and right side walls 24 and 30 adjacent their upper edges 110 and 72, respectively. Also, each of the trusses 58 bows upward symmetrically to a maximum height at its center to elevate the cover 36. This divides the cover 36 into its left and right downward sloping panels 36a and 36b to effectuate precipitation removal when in the covered position and to increase volumetric capacity of the hopper 12. The maximum height of each of the bowing trusses 58 is substantially identical and should slope the panels 36a and 36b sufficiently to facilitate such precipitation removal in order to prevent the cover from sagging or developing pockets due to standing precipitation and sunlight exposure. For instance, the center height for a four feet wide cover maybe 10 inches above the hopper's open top side.

To provide structure rigidity, each of the bowing trusses 58 are interconnected at their center by a longitudinally extending support tube 148. In particular, the support tube 148 interconnects the underside of each of the trusses 58 at their center with bolts and brackets (not shown).

As best illustrated by FIGS. 2 and 8, the shaft 40 of the uncovering drive device 38 and the straps 52 of the covering drive device 42 are supported by the trusses 58. In particular, each of the trusses 58 includes an upper planer surface 150, which interconnects substantially flush with the upper edges 110 and 72 or the left and right side walls 24 and 30, and upon which the shaft 40 rotates to move between the covered and uncovered position, when winding and unwinding the cover 36. Also, each of the straps 52 translates along the upper surface 150 of one of the trusses 58. Accordingly, each of the trusses 58 is provided with a width that is at least equivalent to the width of the straps 52. In effect, the trusses 58 prevent the straps 52 from sagging into, and/or impeding with, the open top 16 of the upper chamber 26. The straps may be manufactured from resilient synthetic material such as nylon.

Since the cover 36 is elevated, the vertical extending front and rear panels 60 and 62 are provided to close the ends of the cover apparatus 10. In particular, each of the panels 60 and 62 are formed to have a planar configuration consisting of a rectangular base portion 152 and a triangular upper portion 154 in order to conform to the configuration provided to the cover 36 by the trusses 58 (FIG. 3). The front and rear panels 60 and 62 are attached adjacent to the upper edge of the hopper's front and rear walls 32 and 34, respectively, by bolt and nut combinations 156 (FIG. 7), to extend upward vertically. To guide the cover 36, each of the panels 60 and 62 terminates slightly above the adjacent trusses 58 with an upper edge 158 (FIG. 7). The panels 60 and 62 may be formed from a lightweight, durable rigid material.

The operation of the mechanical roll top cover apparatus 10 of the present invention may be understood upon reference to FIGS. 2 and 4 primarily, which illustrate movement of the cover 36 to its uncovered position and its covered position, respectively. To remove the cover 36 with the uncovering drive device 38, the tool insert 100 of the hand-crank tool 96 is inserted into the socket 98 of the shaft 40. The hand-crank tool 96 then is manually turned clockwise, reference number 50, by its shaft portion 104 in order to rotate the shaft 40 via the tool insert 100 through the universal joint 106.

As the shaft 40 rotates clockwise over the trusses 58 from its central position to the fight side wall 30, the cover 36 winds on the shaft 40 from above and below. That is, the shaft 40 takes up portions of the cover 36 disposed on both sides of it simultaneously. In effect, by providing shaft 40 with an intermediate or central attachment to the cover 36, the cover apparatus 10 is able to remove the cover 36 rapidly. While the cover 36 is being wound, the straps 52 are being paid out from the strap winding systems 120 to follow the free edge 64 of the cover 36 across the open top side 16 of the hopper 12.

Once at the right side wall 30, the shaft 40, with the cover 36 wound thereon, abuts the stop brackets 80 to prevent further translation, as illustrated by FIG. 7. At this time, the cover 36 is removed for loading and inspecting the contents of the hopper 12, and the tool insert 100 of the hand-crank tool 86 may be removed from the socket 98, or the shaft portion 104 may be secured with the crank shaft holder 108 to the rear of hopper 12 for storage.

To cover the open top side 16 of the hopper 12 with the covering drive device 42, the tool insert 100 of the hand-crank tool 96 is inserted into the socket 146 of the shaft 53. The hand-crank tool 96 is then manually turned counterclockwise, reference number 56, by the shaft portion 104 so to rotate the shaft 53. As the shaft rotates counter-clockwise, the strap winding systems 120 operates to wind the straps 52 into the spools 54. This operation draws the free edge 64 of the cover 36 over the trusses 58 to the left side wall 24 for covering the open top side 16 of the hopper. That is, the drawing of the free edge 64 of the cover 36 causes the shaft 40 of the uncovering drive device 38 to rotate counter-clockwise over the trusses 58 from its position against the stop bracket 80, thereby unwinding the cover 36 from above and below the shaft 40 to facilitate rapid covering of the open top side 16 of the hopper 12.

Once at the left side wall 24, the chambers 22 and 26 are covered for transport, the shaft portion 104 should be secured with the crank shaft holder 108 to the rear of hopper 12 for storage. The hand-crank tool 96 is thus used to lock the flexible cover 36 in the covered position. FIGS. 1 and 9 show the shaft portion 104 in the locked position. The hand-crank tool 96 is removed to be placed in uncovering drive device 38 for opening the flexible cover 36 to the uncovered position.

Thus, it is apparent that there has been provided in accordance with invention, a cover system that fully satisfies the objects, aims and advantages set forth above. While the invention has been described in conjunction with a specific embodiment, it is evident that many alternatives, modifications, and variations will be apparent to those skilled in the art in light of the foregoing descriptions.

What is claimed is:

1. A cover apparatus for covering and uncovering a receptacle having a first wall and a second wall and an opening at the top, the open top defining a first end at an upper part of the first wall and an opposite second end at an upper part of the second wall, the cover apparatus comprising:

a flexible material having a fixed edge portion attached adjacent the first end of the receptacle and a non-fixed edge portion which moves to selected positions located between the first end and the second end to provide a closed position when the non-fixed portion is at the second end and an open position when the non-fixed portion is at the first end;

a first rotatable drive including a first rotatable cylindrical shaft and a first manually operable drive connected to the first rotatable shaft to rotate the first rotatable shaft to the open position, the first rotatable shaft having a longitudinal horizontal axis, the first rotatable shaft mounted to the flexible material and parallel to the first and second end and at a location intermediate to the first and second end, the first rotatable cylindrical shaft upon rotation and movement of the longitudinal axis between the first and second end simultaneously receives portions of the flexible material around the first cylindrical shaft to move the non-fixed edge portion from the second end toward the first end and the open position;

at least one strap attached to the flexible material adjacent the non-fixed edge portion;

a second rotatable drive attached to the strap, the second rotatable drive including a second rotatable cylindrical shaft and a second manually operable drive connected to the second rotatable shaft to rotate the second rotatable shaft to position the non-fixed edge portion to the closed position, the second rotatable shaft having a second horizontal axis, the second cylindrical shaft mounted at the upper part of the second wall and parallel to the first cylindrical shaft for winding or unwinding the strap around the second shaft to move the non-fixed edge portion from either the open or closed position to the other of the open or closed position, respectively, as the first rotatable shaft rotates and the horizontal axis of the first rotatable shaft moves between the first end and its location intermediate to the first and second end.

2. A cover apparatus for covering and uncovering a receptacle having a first wall and a second wall and an opening at the top, the open top defining a first end at an upper part of the first wall and an opposite second end at an upper part of the second wall, the cover apparatus comprising:

a flexible material having a fixed edge portion adjacent to and affixed to the first end of the receptacle and a non-fixed edge portion which moves to selected positions located between the first end and the second end to provide a closed position when the non-fixed portion is at the second end and an open position when the non-fixed portion is at the first end;

a plurality of support members to support the flexible material and mounted to an upper portion of the receptacle at the first end and second end, the support members extending across the opening and each being arched upward to a maximum height at a line intermediate between the first and second end to slope the flexible material when the cover apparatus is in a closed position;

a first rotatable drive including a first rotatable cylindrical shaft having a longitudinal horizontal axis mounted to the flexible material and parallel to the first and second end and at a location intermediate to the first and second end, the first rotatable cylindrical shaft simultaneously receives or provides, respectively, portions of the flexible material around or from, respectively, the cylindrical shaft upon rotation and reciprocal movement of the longitudinal axis over the support members between the first and second end and to move the non-fixed edge portion from the second end toward the first end and the open position;

a plurality of straps attached to the flexible material adjacent the non-fixed edge portion, the straps being supported by the support members across the open top;

a second rotatable drive attached to the straps, the second rotatable drive including a second rotatable cylindrical shaft having a second horizontal axis parallel to the longitudinal axis of the first rotatable cylindrical shaft and perpendicular to the support members, the second cylindrical shaft mounted at the upper part of the second wall for winding or unwinding the straps around the second shaft to move the non-fixed edge portion between an open and closed position as the first rotatable shaft rotates and the horizontal axis of the first rotatable shaft reciprocally moves between the first end and its location intermediate to the first and second end.

3. A cover apparatus for covering and uncovering a receptacle as recited in claim 2, wherein the first rotatable drive includes a first manually operable drive connected to the first rotatable shaft to rotate the first rotatable shaft to the open position and the second rotatable drive includes a second manually operable drive connected to the second rotatable shaft to rotate the second rotatable shaft to position the non-fixed edge portion to the closed position, the cover apparatus further comprising:

a plurality of spools located along the second rotatable cylindrical shaft at predetermined locations into which each of the plurality of straps is wound and unwound, the spools for preventing lateral displacement of the straps with respect to the second rotatable cylindrical shaft; and a plurality guide brackets for guiding the straps into the plurality of spools, each of the guide brackets being located adjacent to one of the plurality of spools and having means for restricting lateral displacement of the strap with respect to the spool to guide the strap into the spool and being mounted for rotation about a horizontal axis substantially parallel to the second rotatable cylindrical shaft to allow for variations of an angle of the strap with respect to the second cylindrical shaft as the first cylindrical shaft moves between the first and second end and as the straps are wound and unwound from the spools; and wherein the first drive and the second drive each include a hand crank.

4. A cover apparatus for covering and uncovering a receptacle as recited in claim 1 wherein the cover apparatus further comprises:

a plurality of straps attached to the flexible material adjacent the non-fixed edge portion;

a plurality of spools located along the second rotatable cylindrical shaft at predetermined locations into which each of the plurality of straps is wound and unwound, the spools for preventing lateral displacement of the straps with respect to the second rotatable cylindrical shaft; and a plurality guide brackets for guiding the straps into the plurality of spools, each of the guide brackets being located adjacent to one of the plurality of spools and having means for restricting lateral displacement of the strap with respect to the spool to guide the strap into the spool and being mounted for rotation about a horizontal axis substantially parallel to the second rotatable cylindrical shaft to allow for variations of an angle of the strap with respect to the second cylindrical shaft as the first cylindrical shaft moves between the first and second end and as the straps are wound and unwound from the spools.

5. A cover apparatus for covering and uncovering a receptacle as recited in claim 2, wherein the first rotatable drive includes a first manually operable drive connected to the first rotatable shaft to rotate the first rotatable shaft to the open position and the second rotatable drive includes a second manually operable drive connected to the second rotatable shaft to rotate the second rotatable shaft to position the non-fixed edge portion to the closed position.

* * * * *